United States Patent [19]

Eckert

[11] 4,156,673

[45] May 29, 1979

[54] HYDROGENATED STAR-SHAPED POLYMER

[75] Inventor: Rudolf J. A. Eckert, Amsterdam, Netherlands

[73] Assignee: Shell Oil Company, Houston, Tex.

[21] Appl. No.: 926,779

[22] Filed: Jul. 21, 1978

Related U.S. Application Data

[63] Continuation of Ser. No. 762,211, Jan. 24, 1977, Pat. No. 4,116,917.

[30] Foreign Application Priority Data

Feb. 10, 1976 [GB] United Kingdom ................ 5212/76

[51] Int. Cl.² ............................................... C08K 5/01
[52] U.S. Cl. ............................................ 260/33.6 AQ
[58] Field of Search ................. 252/59; 260/33.6 AQ, 260/880 B; 526/335

[56] References Cited

U.S. PATENT DOCUMENTS

| | | | |
|---|---|---|---|
| 3,668,125 | 6/1972 | Anderson | 252/59 |
| 3,700,633 | 10/1972 | Wald | 260/880 B |
| 3,700,748 | 10/1972 | Winkler | 260/880 B |
| 3,823,203 | 7/1974 | De La Mare | 260/880 B |
| 3,827,999 | 8/1974 | Crossland | 260/880 B |
| 3,985,830 | 10/1976 | Fetters | 260/880 B |

*Primary Examiner*—Paul R. Michl
*Attorney, Agent, or Firm*—Dean F. Vance

[57] ABSTRACT

A viscosity index-improver for lubricating oil compositions is disclosed. This viscosity index improver is a hydrogenated star-shaped polymer comprising a poly(poly-alkenyl coupling agent) nucleus and at least four polymeric arms linked to the nucleus wherein the arms are hydrogenated homopolymers and copolymers of conjugated dienes, hydrogenated copolymers of conjugated dienes and monoalkenyl arenes, or mixtures thereof.

38 Claims, No Drawings

HYDROGENATED STAR-SHAPED POLYMER

This is a continuation of application Ser. No. 762,211, filed Jan. 24, 1977, now U.S. Pat. No. 4,116,917.

BACKGROUND OF THE INVENTION

As is well known, the viscosity of lubricating oils varies with the temperature. Many oils must be employed over a wide temperature range, and it is important that the oil not be too viscous at low temperatures nor too thin at high temperatures. Variation of the viscosity-temperature relationship of an oil is indicated by the well-known viscosity index value. The higher the viscosity index, the less the change in viscosity with change in temperature. At present, viscosity at 210° F. and at 100° F. is used to determine the viscosity index (VI).

Many attempts have been made to improve the properties, particularly the viscosity-temperature relationships and shear stability of lubricating oils. It has been proposed to add various materials to the lubricating oils fot this purpose, among those materials being various polymers. See generally U.S. Pat. Nos. 3,554,911; 3,668,125; 3,772,196; 3,775,329; and 3,835,053. These polymers, disclosed in the above patents, are generally hydrogenated substantially linear polymers of conjugated dienes and, optionally, monoalkenyl aromatic compounds. Such hydrogenated polymers are typically prepared by the anionic solution polymerization of the monomers followed by hydrogenation. This process comprises polymerizing a conjugated diene and, optionally, a monoalkenyl aromatic compound, in solution, in the presence of an anionic initiator to form an unsaturated so-called living polymer. Examples of hydrogenated substantially linear polymers which are commercially used as oil additives include hydrogenated styrene/butadiene and hydrogenated styrene/isoprene copolymers.

Insofar as hydrogenated substantially linear polymers are concerned it is possible to increase the thickening power, and therefore possible to use a lower amount in lubricating oil compositions, by increasing their molecular weight. However, this has the disadvantage that the shear stability of such polymers, in general, decreases with increasing molecular weight. Consequently, the choice of any particular polymer is usually a compromise between a high amount of a lower molecular weight polymer having a good shear stability and a low amount of a higher molecular weight polymer having a poor shear stability. In addition it is difficult to prepare oil concentrates of such polymers containing more than about 10%w thereof which is a further disadvantage of such polymers.

It is significant to note that none of the three prior art patents which disclose a possible branch structure for the polymer (U.S. Pat. Nos. 3,668,125; 3,775,329; and 3,835,053) actually employ a branched polymer in any of their examples. Further, none of these three references in describing the preparation of the polymer VI improvers disclose a coupling agent that would result in polymer having greater than four branches.

A new polymer has now been found that overcomes many of the deficiencies found in the polymers described in the above patents.

SUMMARY OF THE INVENTION

The present invention is directed to a particular hydrogenated star-shaped polymer that possesses some unique and unexpected properties when employed as a viscosity index (VI) improver in lubricating oil compositions. In addition, this polymer may also be employed in fuels oils, such as middle distillate fuels, as well as with mineral lubricating oils and synthetic lubricating oils. In particular, the hydrogenated star-shaped polymer has a poly(polyalkenyl coupling agent) nucleus and at least four, preferably 7–15, polymeric arms linked to the nucleus. These arms are selected from the group consisting of:

(a) hydrogenated homopolymers and hydrogenated copolymers of conjugated dienes;
(b) hydrogenated copolymers of conjugated dienes and monoalkenyl arenes; and
(c) mixtures thereof.

This hydrogenated star polymer when employed as a VI improver in a lubricating oil composition is present in an amount of between about 0.15 and 10.0% by weight. If desired, however, it may be used in a concentrated form, wherein the amount of VI improver is between about 10% and 25% by weight.

The lubricating oils containing the instant VI improvers possess excellent thickening efficiency at high temperature while also possessing very good low temperature viscosity characteristics. Most importantly, by employing the instant VI improvers, as opposed to the prior art VI improvers, a lower amount of VI improver is required in order to obtain the required thickening performance. Further, the instant polymers not only possess much superior oxidative shear stability and permanent shear stability, they also possess significantly improved "temporary shear loss". Temporary shear loss refers to the temporary viscosity loss at high shear stress conditions resulting from the non-Newtonian character of the polymeric VI improvers.

DETAILED DESCRIPTION OF THE INVENTION

The polymers of the instant invention are generally produced by the process comprising the following reaction steps:

(a) polymerizing one or more conjugated dienes and, optionally, one or more monoalkenyl arene compounds, in solution, in the presence of an ionic initiator to form a living polymer,
(b) reacting the living polymer with a polyalkenyl coupling agent to form a star-shaped polymer, and
(c) hydrogenating the star-shaped polymer to form a hydrogenated star-shaped polymer.

The living polymers produced in reaction step (a) of the present process are the precursors of the hydrogenated polymer chains which extend outwardly from the poly(polyalkenyl coupling agent) nucleus.

As is well-known, living polymers may be prepared by anionic solution polymerization of conjugated dienes and, optionally, monoalkenyl arene compounds in the presence of an alkali metal or an alkali-metal hydrocarbon, e.g. sodium naphthalene, as anionic initiator. The preferred initiator is lithium or a monolithium hydrocarbon. Suitable lithium hydrocarbons include unsaturated compounds such as allyl lithium, methallyl lithium; aromatic compounds such as phenyllithium, the tolyllithiums, the xylyllithiums and the naphthyllithiums and in particular the alkyl lithiums such as methyllithium, ethyllithium, propyllithium, butyllithium, amyllithium, hexyllithium, 2-ethylhexyllithium and n-hexadecyllithium. Secondary-butyllithium is the preferred initiator. The initiators may be added to the polymerization mixture in two or more stages optionally together with additional monomer. The living polymers are olefinically and, optionally, aromatically unsaturated.

The living polymers obtained by reaction step (a), which are linear unsaturated living polymers, are prepared from one or more conjugated dienes, e.g. $C_4$ to $C_{12}$ conjugated dienes and, optionally, one or more monoalkenyl arene compounds.

Specific examples of suitable conjugated dienes include butadiene(1,3-butadiene); isoprene; 1,3-pentadiene (piperylene); 2,3-dimethyl-1,3-butadiene; 3-butyl-1,3-octadiene, 1-phenyl-1,3-butadiene; 1,3-hexadiene; and 4-ethyl-1,3-hexadiene with butadiene and/or isoprene being preferred. Apart from the one or more conjugated dienes the living polymers may also be partly derived from one or more monoalkenyl arene compounds. Preferred monoalkenyl arene compounds are the monovinyl aromatic compounds such as styrene, monovinylnaphthalene as well as the alkylated derivatives thereof such as o-, m- and p-methylstyrene, alpha-methylstyrene and tertiary-butylstyrene. Styrene is the preferred monoalkenyl arene compound. The living polymers may also be partly derived from small amounts of other monomers such as monovinylpyridines, alkyl esters of acrylic and methacrylic acids (e.g. methyl methacrylate, dodecyclmethacrylate, octadecyclmethacrylate), vinyl chloride, vinylidene chloride, monovinyl esters of carboxylic acids (e.g. vinyl acetate and vinyl stearate). Preferably, the living polymers are derived entirely from hydrocarbon monomers. If a monoalkenyl arene compound is used in the preparation of the living polymers it is preferred that the amount thereof be below about 50% by weight, preferably about 3% to about 50%.

The living polymers may be living homopolymers, living copolymers, living terpolymers, living tetrapolymers, etc. The living homopolymers may be represented by the formula A—M, wherein M is a carbanionic group, e.g. lithium, and A is polybutadiene or polyisoprene. Living polymers of isoprene are the preferred living homopolymers. The living copolymers may be represented by the formula A—B—M, wherein A—B is a block, random or tapered copolymer such as poly(butadiene/isoprene), poly(butadiene/styrene) or poly(isoprene/styrene). Such formulae, without further restriction, do not place a restriction on the arrangement on the monomers within the living polymers. For example, living poly(isoprene/styrene) copolymers may be living polyisoprene-polystyrene block copolymers, living polystyrene-polyisoprene block copolymers, living poly(isoprene/styrene) random copolymers, living poly(isoprene/styrene) tapered copolymers or living poly(isoprene/styrene/isoprene) block copolymers. As an example of a living terpolymer may be mentioned living poly(butadiene/styrene/isoprene)terpolymers.

As stated above, the living copolymers may be living block copolymers, living random copolymers or living tapered copolymers. The living block copolymers may be prepared by the step-wise polymerization of the monomers e.g. by polymerizing isoprene to form living polyisoprene followed by the addition of the other monomer, e.g. styrene, to form a living block copolymer having the formula polyisoprene-polystyrene-M, or styrene may be polymerized first to form living polystyrene followed by addition of isoprene to form a living block copolymer having the formula polystyrene-polyisoprene-M.

The living random copolymers may be prepared by adding gradually the most reactive monomer to the polymerization reaction mixture, comprising either the less reactive monomer or a mixture of the monomers, in order that the molar ratio of the monomers present in the polymerization mixture be kept at a controlled level. It is also possible to achieve this randomization by gradually adding a mixture of the monomers to be copolymerized to the polymerization mixture. Living random copolymers may also be prepared by carrying out the polymerization in the presence of a so-called randomizer. Randomizers are polar compounds which do not deactivate the catalyst and bring about a tendency to random copolymerization. Suitable randomizers are tertiary amines, such as trimethylamine, triethylamine, dimethylethylamine, tri-n-propylamine, tri-n-butylamine, dimethylaniline, pyridine, quinoline, N-ethylpiperidine, N-methylmorpholine; thioethers, such as dimethyl sulphide, diethyl sulphide, di-n-propyl sulphide, di-n-butyl sulphide, methyl ethyl sulphide; and in particular ethers, such as dimethyl ether, methyl ethyl ether, diethyl ether, di-n-propyl ether, di-n-butyl ether, di-octyl ether, di-benzyl ether, di-phenyl ether, anisole, 1,2-dimethyloxyethane, o-dimethoxy benzene, and cyclic ethers such as tetrahydrofuran.

Living tapered copolymers are prepared by polymerizing a mixture of monomers and result from the difference in reactivity between the monomers. For example, if monomer A is more reactive than monomer B then the composition of the copolymer gradually changes from that of nearly pure poly-A to that of nearly pure poly-B. Therefore, in each living copolymer molecule three regions can be discerned, which gradually pass into each other, and which have no sharp boundaries. One of the outer regions consists nearly completely of units derived from monomer A and contains only small amounts of units derived from monomer B, in the middle region the relative amount of units derived from monomer B greatly increases and the relative amount of units derived from monomer A decreases, while the other outer region consists nearly completely of units derived from monomer B and contains only small amounts of units derived from monomer A. Living tapered copolymers of butadiene and isoprene are preferred living tapered polymers.

Since the living polymers produced in reaction step (a) of the above process are the precursors of the hydrogenated polymer chains which extend outwardly from the poly(polyalkenyl coupling agent)nucleus, it can be seen that the preferred hydrogenated polymer chains are hydrogenated polybutadiene chains, hydrogenated polyisoprene chains, hydrogenated poly(butadiene/isoprene)chains, hydrogenated poly(butadiene/styrene)-chains and hydrogenated poly(isoprene/styrene)-chains.

The solvents in which the living polymers are formed are inert liquid solvents such as hydrocarbons e.g. aliphatic hydrocarbons, such as pentane, hexane, heptane, oxtane, 2-ethylhexane, nonane, decane, cyclohexane, methylcyclohexane or aromatic hydrocarbons, e.g. benzene, toluene, ethylbenzene, the xylenes, diethylbenzenes, propylbenzenes. Cyclohexane is preferred. Mixtures of hydrocarbons e.g. lubricating oils may also be used.

The temperature at which the polymerization is carried out may vary between wide limits such as from −50° C. to 150° C., preferably from about 20° to about 80° C. The reaction is suitably carried out in an inert atmosphere such as nitrogen and may be carried out under pressure e.g. a pressure of from about 0.5 to about 10 bars.

The concentration of the initiator used to prepare the living polymer may also vary between wide limits and is determined by the desired molecular weight of the living polymer.

The molecular weight of the living polymers prepared in reaction step (a) may vary between wide limits. Suitable number average molecular weights are from about 5,000 to about 150,000 with number average molecular weights of from about 15,000 to about 100,000 being preferred. Consequently, the number average molecular weight of the hydrogenated polymer chains of the final star-shaped polymer may also vary between these limits.

The living polymers produced in reaction step (a) are then reacted, in reaction step (b), with a polyalkenyl coupling agent. Polyalkenyl coupling agents capable of forming star-shaped polymers are known. See generally, Fetters et al, U.S. Pat. No. 3,985,830; Milkovich, Canadian Pat. No. 716,645; and British Pat. No. 1,025,295. They are usually compounds having at least two non-conjugated alkenyl groups. Such groups are usually attached to the same or different electron-withdrawing groups e.g. an aromatic nucleus. Such compounds have the property that at least two of the alkenyl groups are capable of independent reaction with different living polymers and in this respect are different from conventional conjugated diene polymerizable monomers such as butadiene, isoprene etc. Pure or technical grade polyalkenyl coupling agents may be used. Such compounds may be aliphatic, aromatic or heterocyclic. Examples of aliphatic compounds include the polyvinyl and polyallyl acetylenes, diacetylenes, phosphates and phosphites as well as the dimethacrylates, e.g. ethylene dimethacrylate. Examples of suitable heretocyclic compounds include divinyl pyridine and divinyl thiophene. The preferred coupling agents are the polyalkenyl aromatic compounds and the most preferred are the polyvinyl aromatic compounds. Examples of such compounds include those aromatic compounds, e.g. benzene, toluene, xylene, anthracene, naphthalene and durene which are substituted by at least two alkenyl groups preferably directly attached thereto. Examples include the polyvinyl benzenes e.g. divinyl, trivinyl and tetravinyl benzenes; divinyl, trivinyl and tetravinyl ortho-, meta- and para-xylenes, divinyl naphthalene, divinyl ethyl benzene, divinyl biphenyl, diisobutenyl benzene, diisopropenyl benzene and diisopropenyl biphenyl. The preferred aromatic compounds are represented by the formula: $A(CH=CH_2)_x$ wherein A is an optionally substituted aromatic nucleus and x is an integer of at least 2. Divinyl benzene, in particular meta-divinyl benzene, is the most preferred aromatic compound. Pure or technical grade divinylbenzene (containing various amounts of other monomers, e.g. styrene and ethyl styrene) may be used. The coupling agents may be used in admixture with small amounts of added monomers which increase the size of the nucleus, e.g. styrene or alkylated styrene. In this case, the nucleus may be described as a poly(dialkenyl coupling agent-/monoalkenyl aromatic compound)nucleus, e.g. a poly(divinylbenzene/monoalkenyl aromatic compound)nucleus. From the above it will be clear that the term divinylbenzene when used to describe the nucleus means either purified or technical grade divinyl benzene.

The polyalkenyl coupling agent should be added to the living polymer after the polymerization of the monomers is substantially complete, i.e. the agent should only be added after substantially all of the monomer has been converted to living polymers.

The amount of polyalkenyl coupling agent added may vary between wide limits but preferably at least 0.5 mole is used per mole of unsaturated living polymer. Amounts of from 1 to 15 moles, preferably from 1.5 to 5 moles are preferred. The amount, which may be added in two or more stages, is usually such so as to convert at least 80 or 85%w of the living polymers into star-shaped polymers.

The reaction step (b) may be carried out in the same solvent as for reaction step (a). A list of suitable solvents is given above. The reaction step (b) temperature may also vary between wide limits e.g. from 0° to 150° C., preferably from 20° to 120° C. The reaction may also take place in an inert atmosphere e.g. nitrogen and under pressure e.g. a pressure of from 0.5 to 10 bars.

The star-shaped polymers prepared in reaction step (b) are characterized by having a dense center or nucleus of cross-linked poly(polyalkenyl coupling agent) and a number of arms of substantially linear unsaturated polymers extending outwardly therefrom. The number of arms may vary considerably but is typically between 4 and 25, preferably from about 7 to about 15. Star-shaped homopolymers may be represented by the formula $A-x(A)_n$ and star-shaped copolymers may be represented by the formula $A-B-x(B-A)_n$ wherein n is an integer, usually between 3 and 24 and x is the poly(-polyalkenyl coupling agent)-nucleus. From the above it can be seen that x is preferably a poly(polyvinyl aromatic coupling agent)nucleus and more preferably a poly(divinylbenzene)nucleus. As stated above it is believed that the nuclei are cross-linked.

Applicant has found that the greater number of arms employed in the instant invention significantly improve both the thickening efficiency and the shear stability of the polymer since it is then possible to prepare a VI improver having a high moleculare weight (resulting in increased thickening efficiency) without the necessity of excessively long arms (resulting in improved shear stability).

Such star-shaped polymers, which are still "living", may then be deactivated or "killed", in known manner, by the addition of a compound which reacts with the carbanionic end group. As examples of suitable deactivators may be mentioned, compounds with one or more active hydrogen atoms such as water, alcohols (e.g. methanol, ethanol, isopropanol, 2-ethylhexanol) or carboxylic acids (e.g. acetic acid), compounds with one active halogen atom, e.g. a chlorine atom (e.g. benzyl chloride, chloromethane), compounds with one ester group and carbon dioxide. If not deactivated in this way, the living star-shaped polymers will be killed by the hydrogenation step (c).

However, before being killed, the living star-shaped polymers may be reacted with further amounts of monomers such as the same or different dienes and/or monoalkenyl arene compounds of the types discussed above. The effect of this additional step, apart from increasing the number of polymer chains, is to produce a further living star-shaped polymer having at least two different types of polymer chains. For example, a living star-shaped polymer derived from living polyisoprene may be reacted with further isoprene monomer to produce a further living star-shaped polymer having polyisoprene chains of different number average molecular weights. Alternatively, the living star-shaped polyisoprene homopolymer may be reacted with styrene monomer to porduce a further living star-shaped copolymer having both polyisoprene and polystyrene homopolymer chains. Thus it can be seen that by different polymer chains is meant chains of different molecular weights and/or chains of different structures. These further polymerizations may take place under substantially the same conditions as described for reaction step (a) of the process. The additional chains may be homopolymer, copolymer chains etc., as described above.

The molecular weights of the star-shaped polymer to be hydrogenated in reaction step (c) may vary between relatively wide limits. However, an important aspect of the present invention is that polymers possessing good shear stability may be produced even though the polymers have very high molecular weights. It is possible to produce star polymers having peak molecular weights between about 25,000 and about 1,250,000. Preferred molecular weights are 250,000 to 1,250,000, while much preferred molecular weights are greater than 500,000. These peak molecular weights are determined by gas permeation chromotography (GPC) on a polystyrene scale.

In step (c), the star-shaped polymers are hydrogenated by any suitable technique. Suitably at least 50%, preferably at least 70%, more preferably at least 90%, most preferably at least 95% of the original olefinic unsaturation is hydrogenated. If the star-shaped polymer is partly derived from a monoalkenyl arene compound, then the amount of aromatic unsaturation which is hydrogenated, if any, will depend on the hydrogenation conditions used. However, preferably less than 10%, more preferably less than 5% of such aromatic unsaturation is hydrogenated. If the poly(polyalkenyl coupling agent)nucleus is a poly(polyalkenyl aromatic coupling agent)nucleus, then the aromatic unsaturation of the nucleus may or may not be hydrogenated again depending upon the hydrogenation conditions used. The molecular weights of the hydrogenated star-shaped polymers correspond to those of the unhydrogenated star-shaped polymers.

The hydrogenation can be carried out in any desired way. A hydrogenation catalyst may be used e.g. a copper or molybdenum compound. Compounds containing noble metals or noble-metal compounds can be used as hydrogenation catalysts. Preference is given to catalysts containing a non-noble metal or a compound thereof of Group VIII of the Periodic Table i.e. iron, cobalt and in particular, nickel. As examples may be mentioned, Raney nickel and nickel on kieselguhr. Special preference is given to hydrogenation catalysts which are obtained by causing metal hydrocarbyl compounds to react with organic compounds of any one of the group VIII metals iron, cobalt or nickel, the latter compounds containing at least one organic compound which is attached to the metal atom by means of an oxygen atom, for instance as described in U.K. patent specification 1,030,306. Preference is given to hydrogenation catalysts obtained by causing an aluminum trialkyl (e.g. aluminum triethyl (Al(Et)$_3$) or aluminum triisobutyl) to react with a nickel salt of an organic acid (e.g. nickel diisopropyl salicylate, nickel naphthenate, nickel 2-ethyl hexanoate, nickel di-tert-butyl benzoate, nickel salts of saturated monocarboxylic acids obtained by reaction of olefins having from 4 to 20 carbon atoms in the molecule with carbon monoxide and water in the presence of acid catalysts) or with nickel enolates or phenolates (e.g. nickel acetonylacetonate, the nickel salt of butylacetophenone).

The hydrogenation of the star-shaped polymer is very suitably conducted in solution in a solvent which is inert during the hydrogenation reaction. Saturated hydrocarbons and mixtures of saturated hydrocarbons are very suitable and it is of advantage to carry out the hydrogenation in the same solvent in which the polymerization has been effected.

A much preferred hydrogenation process is the selective hydrogenation process shown in Wald et al, U.S. Pat. No. 3,595,942. In that process, hydrogenation is conducted, preferably in the same solvent in which the polymer was prepared, utilizing a catalyst comprising the reaction product of an aluminum alkyl and a nickel or cobalt carboxylate or alkoxide. A favored catalyst is the reaction product formed from triethyl aluminum and nickel octoate.

The hydrogenated star-shaped polymer is then recovered in solid form from the solvent in which it is hydrogenated by any convenient technique such as by evaporation of the solvent. Alternatively, an oil, e.g. a lubricating oil, may be added to the solution and the solvent stripped off from the mixture so formed to produce concentrates. Easily handleable concentrates are produced even when the amount of hydrogenated star-shaped polymer therein exceeds 10%w. Suitable concentrates contain from 10 to 25%w of the hydrogenated star-shaped polymer.

The hydrogenated star-shaped polymers may be added to a variety of oils to produce compositions according to the present invention. Examples of oils include fuel oils, e.g. middle distillate fuels, lubricating oils, such as synthetic lubricating oils e.g. an ester oil, but preferably mineral lubricating oils; crude oils and industrial oils. The concentration of the hydrogenated star-shaped polymers in such oils may vary between wide limits with amounts of between about 0.15 and about 10% by weight, especially from about 0.1 to about 5%, more preferably from about 0.5 to about 2.5%w being used. The amounts are based on the weight of the composition.

The principle lubricating compositions of the present invention have as their major component an oil component. This lubricating oil component is well-known. The preferred oils, however, are referred to as High Viscosity Index (HVI) 100 Neutral, HVI 250 Neutral and HVI Bright Stock as well as conbinations of the same. Also included in this general term HVI for the purpose of this description, are very high viscosity index (VHVI) oils such as those prepared via hydrocracking of poor quality oils, such as low viscosity index (LVI) oils. More volatile oils may be employed for special purposes such as (HVI) 80N. These neutral oils are produced by well-known refining methods, such as distillation, dewaxing, deasphalting, dearomatizing, etc., as may be needed, dependant largely on the crude oil used.

The lubricating oil compositions of the instant invention may also contain other additives such as anticorrosion additives, antioxidants, detergents, pour point depressants, one or more additional VI improvers, and others. Typical additives and their descriptions can be found in U.S. Pat. Nos. 3,772,196 and 3,835,053.

The invention is further illustrated by reference to the following examples, which are given for the purpose of illustration only and are not meant to limit the invention to the particular reactants and amounts disclosed.

In Examples 1 to 19, which are concerned with the preparation of the hydrogenated star-shaped polymers, a 5-liter reaction vessel was used and the polymerizations were carried out under nitrogen. In reaction step (a) of these Examples the polymerization reaction mixtures, at 35° C., were first scavenged by adding thereto secondary butyllithium before the polymerizations were initiated. In all of the polymerizations, the conversion of monomers was substantially complete. In reaction steps (a) and (b) of these Examples the references to solutions of secondary butyllithium and divinylbenzene (meta-divinylbenzene, technical grade) refer to solutions in cyclohexane. In addition, the number average molecular weights were determined by GPC, and the peak molecular weights were determined by GPC on polystyrene scale, unless otherwise stated. In reaction step (b) of these Examples, the living star-shaped polymers were "killed" by the addition of a 20% molar excess, based on the amount of secondary butyllithium used in reaction step (a), of 2-ethylhexanol. In reaction step (c) of these Examples, the hydrogenation percentages refer to the percentages of olefinic bonds hydrogenated, in the polymer chains, which were determined by following the hydrogenation by ozone analysis.

EXAMPLE 1

(a) A living polyisoprene homopolymer was prepared by polymerizing isoprene (250 grams (g)) in cyclohexane (1750 g) solution. Polymerization was initiated by adding to the solution 50 mililiters (ml) of a 100 millimole (mmole)/liter solution of secondary butyllithium. The reaction was continued for 3 hours at 50° C. The living polyisoprene homopolymer had a number average molecular weight of 46,000 and a peak molecular weight of 76,000.

(b) The living polymer solution so prepared was cooled to about 25° C. after which was added 76.1 ml of a 197 mmole/liter solution of divinylbenzene. The temperature was then raised to 60° C. and the reaction allowed to proceed for 5 hours after which the living star-shaped polymer was killed. It was determined that more than 92% of the living polymer had been converted to star-shaped polyisoprene.

(c) The reaction vessel was then purged with hydrogen after which was added a hydrogenation catalyst prepared by mixing, at 40° C., 44.1 ml of a 0.0728 molar solution of Ni(octoate)$_2$ in cyclohexane and 30.9 ml of a 0.22 molar solution of Al(Et)$_3$ in cyclohexane. The star-shaped polyisoprene solution was then hydrogenated (>95%) at a temperature of 65° C. and a hydrogen pressure of 38 kg/cm$^2$. The hydrogenation catalyst was then extracted by washing the solution at about 70° C. with an aqueous solution of citric acid (1%w) and with water. The peak molecular weight of the hydrogenated star-shaped polyisoprene was 520,000 (on polystyrene scale) and 270,000 (on hydrogenated linear polyisoprene scale).

EXAMPLE 2

(a) Example 1(a) was repeated with the differences that the amounts of isoprene and cyclohexane were 340.5 g and 1362 g respectively and that the polymerization was initiated with 80.5 ml of a 94 mmole/liter solution of secondary butyllithium. The polymerization was continued for 2.5 hours at 50° C. The number average molecular weight of the living polyisoprene homopolymer was 44,000.

(b) The living polymer solution so prepared was reacted with 34.1 ml of a 650 mmole/liter solution of divinylbenzene at 80° C. for 2.5 hours after which the living star-shaped polymer was killed. It was determined that 95% of the living polymers had been converted to star-shaped polyisoprene.

(c) The star-shaped polyisoprene solution so prepared was hydrogenated (99.4%) using the procedure of Example 1(c). The peak molecular weight of the hydrogenated star-shaped polyisoprene was 540,000.

EXAMPLE 3

(a) Example 2(a) was repeated with the differences that the amounts of cyclohexane was 1451 g and that the polymerization was initiated with 76.4 ml of a 92 mmole/liter solution of secondary butyllithium. The number average molecular weight of the living polyisoprene homopolymer was 43,000.

(b) The living polymer solution so prepared was reacted with 66.7 ml of a 481 mmole/liter solution of divinylbenzene, pre-heated to a temperature of 72° C., at 80° C. for 2.5 hours after which the living star-shaped polymer was killed. It was determined that 92% of the living polymers had been converted to star-shaped polyisoprene.

(c) The star-shaped polyisoprene solution so prepared was hydrogenated (98.9%) using the procedure of Example 1(c). The peak molecular weight of the hydrogenated star-shaped polyisoprene was 474,000.

EXAMPLE 4

(a) Example 2(a) was repeated with the differences that the amounts of isoprene and cyclohexane was 400 g and 1600 g respectively and that the polymerization was initiated by 124.2 ml of a 92 mmole/liter of secondary butyllithium. The number average molecular weight of the living polyisoprene homopolymer was 34,000.

(b) The living polymer solution so prepared was reacted with 165.3 ml of a 205 mmole/liter solution of divinylbenzene at 80° C. for 2.5 hours after which the living star-shaped polymer was killed. It was determined that 93% of the living polymers had been converted to star-shaped polyisoprene.

(c) The star-shaped polyisoprene solution so prepared was hydrogenated (99.3%) using the procedure of Example 1(c). The peak molecular weight of the hydrogenated star-shaped polyisoprene was 400,000.

EXAMPLE 5

(a) A living polyisoprene homopolymer was prepared by polymerizing isoprene (170.25 g) in cyclohexane (1362 g) solution. Polymerization was initiated by the addition of 63 ml of a 90 mmole/liter solution of secondary butyllithium. The reaction was continued for 2 hours at 50° C. Further amounts of secondary butyllithium solution (63 ml of a 90 mmole/liter solution) and isoprene (170.25 g) were then charged to the reactor and allowed to react for a further two hours at 50° C. The living polyisoprene homopolymer so prepared exhibited two different number average molecular weights of 15,000 and 45,000 respectively.

(b) The living polymer solution so prepared was reacted with 70.5 ml of a 625 mmole/liter solution of divinylbenzene at 80° C. for 2.5 hours after which the living polymer was killed. It was determined that 94% of the living polymers had been converted to star-shaped polyisoprene.

(c) The star-shaped polyisoprene solution so prepared was hydrogenated (98.8%) using the procedure of Example 1(c). The peak molecular weight of the hydrogenated star-shaped polyisoprene was 413,000.

EXAMPLE 6

(a) Example 2(a) was repeated.

(b) The living polyisoprene homopolymer solution so obtained was reacted with a mixture of 34.5 ml of a 625 mmole/liter solution of divinylbenzene which also contained additional styrene (24.8 g), at 80° C. for 2.5 hours, after which the living star-shaped polymer was killed. It was determined that 91% of living polymers had been converted to star-shaped polyisoprene.

(c) The star-shaped polyisoprene solution so prepared was hydrogenated (99.5%) using the procedure of Example 1(c). The peak molecular weight of the hydrogenated star-shaped polyisoprene was 574,000.

EXAMPLES 7 to 10

(a) Four living poly(isoprene/butadiene) tapered copolymers (a–d) were prepared by polymerizing a mixture of isoprene (139.3 g) and butadiene (110.6 g) in cyclohexane (1790 g) solution. The amounts of secondary butyllithium used are given in Table I along with the molecular weights of the living poly(isoprene/butadiene) tapered copolymers prepared.

Table I

| Living polymer | Solution of sec. butyl lithium (100 mmole/liter) (ml) | number average molecular | Peak molecular weight |
|---|---|---|---|
| (a) | 83.3 | 36,000 | 50,000 |
| (b) | 62.5 | 43,000 | 58,000 |
| (c) | 60.0 | 46,000 | 63,600 |
| (d) | 50.0 | 56,000 | 70,000 |

(b) The four living polymer solutions so prepared were reacted with various amounts of divinylbenzene solutions using the procedure of Example 1(b). The reaction conditions and the amounts of divinylbenzene used as well as the percentages of living polymers converted to star-shaped poly(isoprene/butadiene) tapered copolymers are given in Table II.

(c) The star-shaped copolymers so prepared were hydrogenated (>95%) using the procedure of Example 1(c). The peak molecular weights of the hydrogenated star-shaped poly(isoprene/butadiene) tapered copolymers are also given in Table II.

Table II

| Ex. | Living polymer used | Solution of divinylbenzene (197 mmole/liter) (ml) | Temp. (°C.) | Time (hours) | Conversion (%) | Peak molecular weight |
|---|---|---|---|---|---|---|
| 7 | (a) | 129.3 | 60 | 5 | 94 | 344,000 |
| 8 | (b) | 93.1 | 60 | 6 | 92 | 421,000 |
| 9 | (c) | 93.5 | 60 | 6 | 96 | 489.000 |
| 10 | (d) | 74.9 | 60 | 6 | >92 | 557,000 |

EXAMPLE 11

(a) A living poly(isoprene/butadiene) random copolymer was prepared by polymerizing, under a pressure of 5.2 absolute, a mixture of isoprene (30 g) and butadiene (270 g) in cyclohexane (1200 g), in the presence of 3.5%w of diethyl ether. Polymerization was initiated by adding to the solution 70.2 ml of a 95 mmole/liter solution of secondary butyllithium. The reaction was continued for 2.5 hours at 45° C. The peak molecular weight of the living poly(isoprene/butadiene) random copolymer was 86,000.

(b) The living polymer so prepared was reacted with 31.3 ml of a 625 mmole solution of divinylbenzene at 45° C. for 2.5 hours after which the living star-shaped polymer was killed. It was determined that 90% of the living polymers had been converted to star-shaped poly(isoprene/butadiene) random copolymers.

(c) The star-shaped copolymers solutions so prepared was hydrogenated (97.4%) using the procedure of Example 1(c). The peak molecular weight of the hydrogenated star-shaped poly(isoprene/butadiene) random copolymer was 634,000.

EXAMPLE 12

(a) A living poly(styrene/isoprene) block copolymer, having the structure polystyrene-polyisoprene-Li, was prepared by polymerizing styrene (34.0 g) in cyclohexane (1362 g) solution. Polymerization was initiated by adding to the solution 75.7 ml of a 90 mmole/liter solution of secondary butyllithium. The reaction was continued for 2 hours at 50° C. The living polystyrene homopolymer solution was then reacted with isoprene (306.5 g) for a further 2 hours at 50° C. The number average molecular weight of the living poly(styrene/isoprene) block copolymer was 49,000.

(b) The living polymer solution so prepared was reacted with 31.0 ml of a 625 mmole/liter solution of divinylbenzene at 80° C. for 2.5 hours after which the living star-shaped polymer was killed. It was determined that 93% of the living polymers had been converted to star-shaped poly(styrene/isoprene) block copolymers.

(c) The star-shaped copolymer solution so prepared was hydrogenated (99.5%) using the procedure of Example 1(c). The peak molecular weight of the hydrogenated star-shaped poly(styrene/isoprene) block copolymer was 504,000.

EXAMPLE 13

(a) A living poly(isoprene/styrene) block copolymer, having the structure polyisoprene-polystyrene-Li, was prepared by polymerizing isoprene (310.2 g) in cyclohexane (1362 g) solution. Polymerization was initiated by adding 79.6 ml of a 95 mmole/liter solution of secondary butyllithium. The reaction was continued for 2.5 hours at 50° C. The living polyisoprene homopolymer (number average molecular weight 41,000) solution was then reacted with styrene (30.3 g) for a further 2.5 hours at 50° C. The number average molecular weight of the living poly(isoprene/styrene) block copolymer was 45,000.

(b) The living polymer solution so prepared was reacted with 34.6 ml of a 625 mmole/liter solution of divinylbenzene at 80° C. for 2.5 hours after which the living star-shaped polymer was killed. It was determined that 90% of the living polymers had been converted to star-shaped poly(isoprene/styrene) block copolymers.

(c) The star-shaped copolymer solution so prepared was hydrogenated (98.5%) using the procedure of Example 1(c). The peak molecular weight of the hydrogenated star-shaped poly(isoprene/styrene) block copolymer was 499,000.

EXAMPLE 14

(a) A living poly(isoprene/styrene) tapered copolymer was prepared by polymerizing a mixture of isoprene (360.0 g) and styrene (40.2 g) in cyclohexane (2050 g). Polymerization was initiated by adding to the solution 93.6 ml of a 95 mmole/liter solution of secondary butyllithium. The reaction was continued for 2.5 hours at 50° C. The number average molecular weight of the living poly(isoprene/styrene) tapered copolymer was 43,400.

(b) The living polymer solution so prepared was reacted with 41.8 ml of a 625 mmole/liter solution of divinylbenzene at 80° C. for 2.5 hours after which the living star-shaped polymer was killed. It was determined that 94% of the living polymers had been converted to star-shaped poly(isoprene/styrene) tapered copolymers.

(c) The star-shaped copolymer solution so prepared was hydrogenated (98.2%) using the procedure of Example 1(c). The peak molecular weight of the hydrogenated star-shaped poly(isoprene/styrene) tapered copolymer was 489,000.

EXAMPLE 15

(a) A living poly(isoprene/styrene) random copolymer was prepared by polymerizing isoprene (102.2 g) and styrene (34.2 g) in cyclohexane (1208 g). Polymerization was initiated by the addition of 79.6 ml of a 95 mmole/liter solution of secondary butyllithium. Immediately after initiation a solution of isoprene (204 g) and cyclohexane (156 g) was pumped into the reaction vessel at a constant rate over 45 minutes. The reaction temperature was 50° C. and the total reaction time was 3.25 hours. The number average molecular weight of the living poly(isoprene/styrene) random copolymer was 42,200.

(b) The living copolymer solution so prepared was reacted with 33.9 ml of 578 mmole/liter solution of divinylbenzene at 80° C. for 2.5 hours, after which the living star-shaped polymer was killed. It was determined that 92% of the living polymers had been converted to star-shaped poly(isoprene/styrene) random copolymers.

(c) The star-shaped copolymer solution so prepared was hydrogenated (98.9%) using the procedure of Example 1(c). The peak molecule weight of the hydrogenated star-shaped poly(isoprene/styrene) random copolymer was 451,000.

EXAMPLE 16

(a) A living poly(isoprene/styrene/isoprene) three block copolymer was prepared by polymerizing isoprene (151.3 g) in cyclohexane (1362 g) solution. Polymerization was initiated by the addition of 79.5 ml of a 95 mmole/liter solution of secondary butyllithium. The reaction was continued for 2.5 hours at 50° C. The living polyisoprene (number average molecular weight 25,600) solution formed was then reacted with styrene (37.9 g) and the reaction was continued for a further 2.5 hours at 50° C. The living poly(isoprene/styrene) block copolymer (number average molecular weight 31,200) solution formed was then reacted with a further amount of isoprene (151.3 g) and the reaction was continued for a further 2.5 hours at 50° C. The number average molecular weight of the living poly(isoprene/styrene/isoprene) block copolymer was 54,400.

(b) The living polymer solution so prepared was reacted with 37.1 ml of a 578 mmole/liter solution of divinylbenzene at 80° C. for 2.5 hours, after which the living star-shaped polymer was killed. It was determined that 94% of the living polymers had been converted to star-shaped poly(isoprene/styrene/isoprene) block copolymers.

(c) The star-shaped copolymer solution so prepared was hydrogenated (98.5%) using the procedure of Example 1(c). The peak molecular weight of the hydrogenated star-shaped poly(isoprene/styrene/isoprene) block copolymer was 585,000.

EXAMPLE 17

(a) A living polyisoprene homopolymer was prepared by polymerizing isoprene (170 g) in cyclohexane (2097 g) solution. Polymerization was initiated by the addition of 44.7 ml of a 95 mmole/liter solution of secondary butyllithium. The reaction was continued for 2 hours at 50° C. The number average molecular weight of the living polyisoprene homopolymer was 41,000.

(b) (i) The living polymer solution so prepared was reacted with 20 ml of a 625 mmole solution of divinylbenzene at 80° C. for 2.5 hours. It was determined that 91% of the living polymers had been converted to star-shaped polyisoprene.

(ii) The living star-shaped polyisoprene homopolymer solution so prepared was then reacted with styrene (42.1 g) at 50° C. for a further 2 hours, after which the living star-shaped mixed polyisoprene/polystyrene copolymer was killed.

(c) The star-shaped copolymer solution so prepared was hydrogenated (97.8%) using the procedure of Example 1(c). The peak molecular weight of the hydrogenated star-shaped mixed polyisoprene/polystyrene copolymer was 484,000.

EXAMPLE 18

(a) A living polyisoprene homopolymer was prepared by polymerizing isoprene (149.8 g) in cyclohexane (1867 g) solution. Polymerization was initiated by the addition of 39.4 ml of a 95 mmole/liter solution of sec. butyllithium. The reaction was continued for 2 hours at 50° C. The number average molecular weight of the living polyisoprene homopolymer was 39,800.

(b) (i) The living polymer solution so prepared was reacted with 17.6 ml of a 625 mmole/liter solution of divinylbenzene at 80° C. for 2.5 hours. It was determined that 93% of the living polymers had been converted to star-shaped polyisoprene.

(ii) The living star-shaped polyisoprene solution so prepared was reacted with styrene (3.4 g) at 50° C. for 0.25 hours.

(iii) The living star-shaped mixed polyisoprene/polystyrene copolymer so prepared was reacted with isoprene (43.1 g) at 50° C. for 2.5 hours, after which the living star-shaped mixed polyisoprene/polystyrene/polyisoprene copolymer was killed.

(c) The star-shaped copolymer solution was hydrogenated (99.1%) using the procedure of Example 1(c). The peak molecular weight of the hydrogenated star-shaped mixed polyisoprene/polystyrene/polyisoprene copolymer was 388,000.

EXAMPLE 19

(a) A living polyisoprene homopolymer was prepared by polymerizing isoprene (300 g) in cyclohexane (1500 g) solution. Polymerization was initiated by the addition of 83.3 ml of a 90 mmole/liter solution of secondary butyllithium and was continued for 2 hours at 50° C. The number average molecular weight of the living polyisoprene homopolymer was 42,000.

(b) (i) The living polymer solution so prepared was reacted with 35 ml of 625 mmole/liter solution of divinylbenzene at 80° C. for 2.5 hours. It was determined that 95% of the living polymers had been converted to star-shaped living polyisoprene.

(ii) The living star-shaped polyisoprene homopolymer solution so prepared was reacted with a further amount of isoprene (20.8 g) at 50° C. for 2 hours to produce a living star-shaped polyisoprene homopolymer, having additional chains derived from this further amount of isoprene, which was then killed.

(c) The star-shaped homopolymer solution so prepared was hydrogenated (98.8%) using the procedure of Example 1(c). The hydrogenated star-shaped polyisoprene homopolymer had a peak molecular weight of 456,000.

The hydrogenated star-shaped polymers prepared according to Examples 1 to 19 are characterized by having poly(divinylbenzene) nuclei, which are believed to be cross-linked, with the exception of the hydrogenated star-shaped polymer of Example 6 which was characterized by having a poly(divinylbenzene/styrene) nucleus. They were also characterized by having a plurality of hydrogenated polymer chains of one or more conjugated dienes, and optionally a monoalkenyl compound, extending outwardly therefrom. In most cases, the number of hydrogenated polymer chains or arms was between 7 and 15.

EXAMPLE 20

The solution of hydrogenated star-shaped polymers prepared by Examples 1 to 19, were diluted with Quatar Marine HVI 60 lubricating base oil and the cyclohexane stripped off to produce oil concentrates containing from 10 to 25%w of the polymers.

EXAMPLES 21 to 42

Multi-grade lubricating oil compositions were prepared from the hydrogenated star-shaped polymer concentrates described in Example 20. The concentrates were added to a Quatar Marine HVI 60 base oil (viscosity index 95) together with 0.5%w of a polymethacrylate pour-point depressant and 10.1%w of a commercial lube-oil package containing a polyalkylsuccinimide and/or polyalkylsuccinate and a zinc dialkyldithiophosphate. The amounts of polymer present, based on weight of compositions, are given in Table III.

The kinematic viscosities of the compositions at 302° F., 210° F. and 100° F. (ASTM D445), dynamic viscosities at 0° F. (ASTM D2602), viscosity indices (extrapolated, $VI_E$) and shear stabilities (DIN 51382) were determined. The results are given in Table III.

Particular significance is placed on the findings that the shear stabilities of the polymers of the instant invention are very good, especially in view of the high molecular weights thereof, that small amounts of the polymers have good thickening power (see $V_{K210°F.}$ results) and that the $V_{K302°F.}$ results are good.

For comparative purposes, multi-grade lubricating oil compositions, containing the polymers described below, were prepared and tested as described above. The results are also given in Table III.

The polymers tested were:

(a) a hydrogenated styrene-butadiene tapered copolymer (not branched) having a peak molecular weight of 100,000;

(b) a hydrogenated styrene-isoprene two block copolymer having a peak molecular weight of 140,000;

(c) the unhydrogenated star-shaped polymer prepared by Example 3(b).

Table III

| Example | Polymer | Amount of polymer %w | $V_K$ 302° F. cS | $V_K$ 210° F. cS | $V_K$ 100° F. cS | $V_D$ °F. poise | $VI_E$ | Shear stability, % |
|---|---|---|---|---|---|---|---|---|
| 21 | 1 | 1.5 | 7.7 | 19.0 | 133.2 | 19.6 | 172 | 5.2 |
| 22 | 2 | 1.5 | 7.4 | 18.5 | 128.9 | 19.1 | 172 | 7.4 |
| 23 | 3 | 1.6 | 7.3 | 18.1 | 125.4 | — | 171 | 3.8 |
| 24 | 4 | 1.9 | 7.6 | 18.9 | 133.5 | 21.5 | 170 | 2.2 |
| 25 | 5 | 1.8 | — | 18.6 | 129.5 | 22.3 | 172 | — |
| 26 | 6 | 1.6 | 7.6 | 18.9 | 134.6 | 19.9 | 169 | 6.8 |
| 27 | 7 | 1.9 | 7.7 | 19.1 | 133.4 | 20.5 | 173 | 4.5 |
| 28 | 8 | 1.6 | 7.5 | 18.8 | 131.5 | 17 | 171 | 2.7 |
| 29 | 9 | 1.4 | 7.6 | 18.9 | 132.3 | 19 | 172 | 2.8 |
| 30 | 10 | 1.3 | 7.8 | 19.6 | 138.2 | 16 | 173 | 4.4 |
| 31 | 11 | 1.5 | 7.9 | 19.8 | 135.7 | 18.3 | 177 | — |
| 32 | 12 | 1.5 | — | 19.1 | 134.5 | 18.2 | 171 | — |
| 33 | 13 | 1.7 | 7.5 | 18.4 | 127.2 | 20.6 | 172 | 5.2 |
| 34 | 14 | 1.7 | 7.6 | 18.8 | 129.7 | 20.5 | 174 | 5.0 |
| 35 | 15 | 1.8 | 7.9 | 19.2 | 135 | 20.9 | 172 | 4.0 |
| 36 | 16 | 1.5 | 7.6 | 18.7 | 129.1 | 19.6 | 173 | 9.3 |
| 37 | 17 | 2.0 | 8.1 | 19.08 | 124.7 | 20.4 | 184 | — |
| 38 | 18 | 1.0 | — | 18.5 | 127.6 | — | 174 | — |
| 39 | 19 | 2.2 | — | 18.9 | 130.7 | 20.5 | 174 | — |
| 40 | a | 3.5 | 7.3 | 19.7 | 144.5 | 24 | 168 | 4.5 |
| 41 | b | 1.8 | 5.4 | 19.8 | 125.9 | 15.6 | 190 | 9.8 |
| 42 | c | 1.6 | — | 12.0 | — | — | — | — |

What is claimed is:

1. A lubricating oil composition comprising a major proportion of a lubricating oil and between 0.15 and 10.0% by weight of a hydrogenated star-shaped polymer wherein said polymer comprises a poly(poly-alkenyl coupling agent) nucleus and at least seven polymeric arms linked to said nucleus wherein said polymeric arms are hydrogenated copolymers of conjugated dienes and monoalkenyl arenes.

2. A composition according to claim 1 wherein the number of polymeric arms is between about 7 and 15.

3. A composition according to claim 1 wherein the polyalkenyl coupling agent is a poly-vinyl aromatic compound.

4. A composition according to claim 1 wherein the polyalkenyl coupling agent is divinyl benzene.

5. A composition according to claim 1 wherein the nucleus is a poly(divinyl benzene/monoalkenyl arene).

6. A composition according to claim 1 wherein the number average molecular weight of each polymeric arm is between about 5,000 and about 150,000.

7. A composition according to claim 2 wherein the number average molecular weight of each polymeric arm is between about 5,000 and about 150,000.

8. A composition according to claim 1 wherein the peak molecular weight of the hydrogenated star-shaped polymer is between about 250,000 and about 1,250,000.

9. A composition according to claim 8 wherein the peak molecular weight of the hydrogenated star-shaped polymer is greater than about 500,000.

10. A composition according to claim 9 wherein the number of polymeric arms is between about 7 and about 15.

11. A composition according to claim 4 wherein each polymeric arm is a poly(styrene/butadiene) copolymer.

12. A composition according to claim 11 wherein the structure of the polymeric arm is a random copolymer, block copolymer, or tapered block copolymer.

13. A composition according to claim 11 wherein the number of polymeric arms is between about 7 and about 15.

14. A composition according to claim 11 wherein the number average molecular weight of each polymeric arm is between about 5,000 and about 150,000.

15. A composition according to claim 11 wherein the peak molecular weight of the hydrogenated star-shaped polymer is between about 250,000 and about 1,250,000.

16. A composition according to claim 11 wherein the hydrogenated polymer contains less than about 70% of its original olefinic unsaturation.

17. A composition according to claim 16 wherein less than 10% of the aromatic unsaturation is hydrogenated.

18. A composition according to claim 11 wherein the weight percentage of styrene in each polymeric arm is between about 3% and about 50%.

19. A composition according to claim 4 wherein each polymeric arm is a poly(styrene/isoprene) copolymer.

20. A composition according to claim 19 wherein the structure of the polymeric arm is a random copolymer, block copolymer, or tapered block copolymer.

21. A composition according to claim 19 wherein the number of polymeric arms is between about 7 and about 15.

22. A composition according to claim 19 wherein the number average molecular weight of each polymeric arm is between about 5,000 and about 150,000.

23. A composition according to claim 19 wherein the peak molecular weight of the hydrogenated star-shaped polymer is between about 250,000 and about 1,250,000.

24. A composition according to claim 19 wherein the hydrogenated polymer contains less than about 70% of its original olefinic unsaturation.

25. A composition according to claim 24 wherein less than 10% of the aromatic unsaturation is hydrogenated.

26. A composition according to claim 19 wherein the weight percentage of styrene in each polymeric arm is between about 3% and about 50%.

27. An oil concentrate comprising a major proportion of a lubricating oil and between about 10% and 30% by weight of a viscosity index improver comprising a hydrogenated star-shaped polymer having a poly(divinylbenzene) nucleus and at least seven polymeric arms linked to said nucleus wherein said polymeric arms are hydrogenated copolymers of monoalkenyl arenes and conjugated dienes.

28. An oil concentrate according to claim 27 wherein said polymeric arms are selectively hydrogenated copolymers of styrene and isoprene.

29. An oil concentrate according to claim 28 wherein said copolymer is a block copolymer.

30. A composition according to claim 1 wherein the structure of the polymeric arm is a random copolymer, block copolymer, or tapered copolymer.

31. A composition according to claim 30 wherein the structure of the polymeric arm is a block copolymer and wherein the monoalkenyl arene block is directly attached to the nucleus.

32. A composition according to claim 30 wherein the structure of the polymeric arm is a block copolymer, the hydrogenated conjugated diene block is directly attached to the nucleus, and the molecular weight of the monoalkenyl arene block is less than about 9,000.

33. A composition according to claim 30 wherein the structure of the polymeric arm is a block copolymer, the hydrogenated conjugated diene block is directly attached to the nucleus, and the molecular weight of the monoalkenyl arene block is between 4,000 and 5,000.

34. A non-gelling composition according to claim 1.

35. A composition according to claim 1 wherein the structure of the polymeric arm is a random copolymer.

36. A composition according to claim 1 wherein the structure of the polymeric arm is a tapered copolymer.

37. A composition according to claim 17 wherein the structure of the polymeric arm is a random copolymer.

38. A composition according to claim 25 wherein the structure of the polymeric arm is a tapered copolymer.

* * * * *